(No Model.)
F. W. JONES.
MEANS FOR OVERCOMING STATIC TROUBLES IN TELEGRAPHS.
No. 304,106. Patented Aug. 26, 1884.
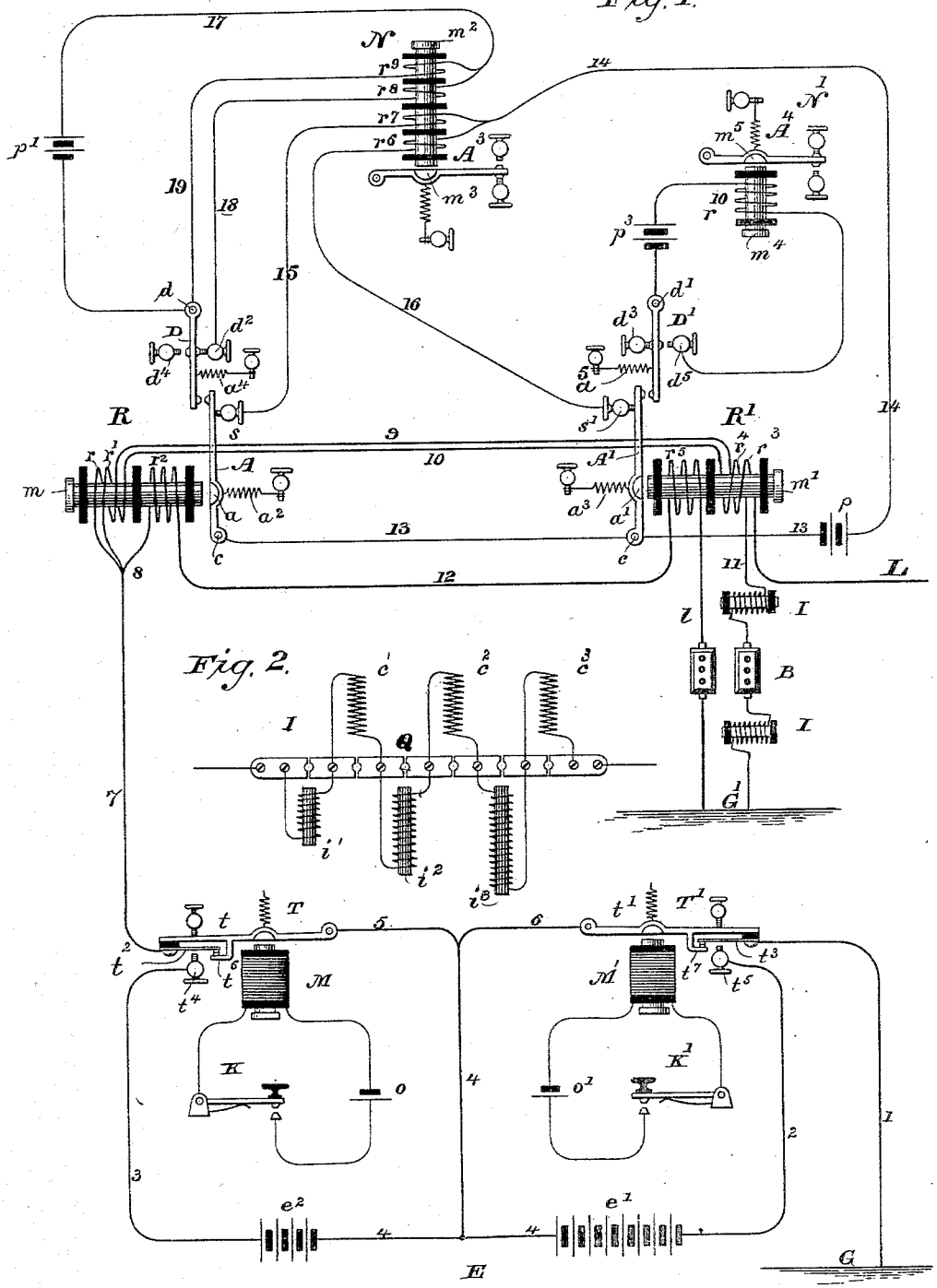
WITNESSES
Wm A. Skinkle.
Geo W. Breck.
By his Attorneys
Pope Edgecomb & Butler
INVENTOR
Francis W. Jones.

UNITED STATES PATENT OFFICE.

FRANCIS W. JONES, OF NEW YORK, N. Y.

MEANS FOR OVERCOMING STATIC TROUBLES IN TELEGRAPHS.

SPECIFICATION forming part of Letters Patent No. 304,106, dated August 26, 1884.

Application filed August 20, 1883. (No model.)

*To all whom it may concern:*

Be it known that I, FRANCIS W. JONES, a citizen of the United States, residing in the city, county, and State of New York, have invented certain new and useful Improvements in Multiple Telegraphy, of which the following is a specification.

My invention relates to that system of telegraphy in which two or more independent signals or series of signals are simultaneously transmitted in opposite directions over one and the same telegraphic conductor. In the practical operation of this system the correct reception of the signals from the distant station is more or less interfered with and obstructed by false signals, which are produced upon the receiving instrument or instruments at the home station by momentary charges and discharges of static and induced electricity, which pass to and from the main line at the instant a connection is established between the battery and the main line, or between said line and the earth, by means of the keys or transmitters. These effects are especially troublesome when the line (if it be a land line) is of considerable length and well insulated, and also when a submarine cable constitutes the whole or a considerable portion of the conductor.

In my prior Letters Patent No. 260,208, dated June 27, 1882, I have described and claimed an organization of apparatus for neutralizing the injurious effects of static charge and discharge upon the apparatus at the home station, which organization consists, essentially, of a branch line returning directly to the earth at the home station, in combination with a receiving-instrument wound with two independent assisting coils, one of which is included in the main and the other in the branch line, and an inductor or core of soft iron surrounded by a coil, which coil is included in said branch line.

The object of this invention is to better adapt the organization referred to above to the systems of duplex and quadruplex telegraphs now commonly employed.

In carrying out my present invention I place the assisting coil upon the differential magnet of the receiving instrument or instruments at the home station, and so construct it that the combined magnetizing effects of the main-line coil and the assisting coil thereupon shall be exactly neutralized by the equal and opposite effect of the coil included in the artificial line. By this means I am enabled to apply the same principle of operation to any of the ordinary differential systems of duplex or quadruplex telegraphy.

I have hereinafter shown and described my invention as applied to a quadruplex system of transmission; but it is equally applicable to the more simple duplex system, and may be applied thereto without difficulty by persons skilled in the art to which the invention appertains.

In applying my invention to a quadruplex system I prefer to employ, in connection with electric currents of a given polarity and having determinate relative strengths, two differential electro-magnetic relays, constructed to respond to incoming electric currents, and to cause to be actuated either one or both of two local or secondary receiving-instruments, according to the relative strengths of the currents received. The differential electro-magnets are each constructed with three independent helices or coils of wire, two of which are wound in the same direction and have an aggregate magnetizing capacity equal but opposite to that of the third coil, which is wound in the opposite direction. The conductor forming the single opposing helix upon each electro-magnet extends through an adjustable rheostat to the earth and forms an artificial or equating line. One of the parallel conductors forming the double assisting helix, after traversing the electro-magnet, is likewise connected with the earth through an adjustable artificial resistance and one or more electro-magnetic or Varley coils. The remaining conductor is connected with and forms a part of the main line. The secondary receiving instrument or instruments are so connected with receiving-relays and local batteries that currents of a given strength will actuate one of the instruments, currents of a given increased strength the other only, and currents of aggregate or combined strength will actuate both instruments.

In the accompanying drawings, Figure 1 is a diagram illustrating the arrangement of apparatus at one station as applied to a quadruplex system, and showing both the transmitting and the receiving devices, together with their electrical connections; and Fig. 2 is a diagram illustrating in detail the construction of the electro-magnetic inductor.

Referring to the drawings, $o$ and $o'$ represent two local batteries, including in their circuit the electro-magnets M and M', respectively, and keys K and K'. These batteries and keys are employed for actuating two transmitters, T and T', respectively, by closing the circuits therethrough in a manner well understood. Each of the transmitters T and T' consists of an armature-lever, $t$ and $t'$, each provided with contact-springs $t^2$ and $t^3$, normally in contact with the resting contact-stops $t^6$ and $t^7$, respectively, and at the same time severing their connections with the working-contacts $t^4$ and $t^5$. The opposite poles of a main battery, E, are respectively connected by the wires 3 and 2 with the working-contacts $t^4$ and $t^5$. The battery E is divided into two sections, $e'$ and $e^2$, which are united by means of a conductor, 4, connected with the armature-levers $t$ and $t'$ by the wires 5 and 6, respectively. The section $e^2$ is preferably formed of a number of elements, giving it an electro-motive force one-half as great as that of the section $e'$. The contact-springs of the key-levers $t$ and $t'$ are respectively connected by the wire 7 through the receiving-instruments with the main line L, and by the wire 1 with the earth at G.

It will be observed that when the apparatus is in its normal position no current is sent to the main line L from the battery $e^2$. If, however, the armature-lever $t$ be depressed, by closing the circuit of the local battery $o$ through the electro-magnet M, the contact-spring $t^2$ will be brought into connection with the working-contact $t^4$, and will be raised from the resting-contact $t^6$. The circuit of the battery-section $e^2$ will thereupon be closed, the negative pole being connected by the wires 4 and 6, key-lever $t'$, resting-contact $t^7$, contact-spring $t^3$, and wire 1 with the earth at G, while the positive pole is connected by the wire 3 with the working-contact $t^4$ and contact-spring $t^2$ with the wire 7, and thus through the relay-instruments to the main line. If, on the other hand, the key-lever $t'$ be depressed, by closing the circuit of the local battery $o'$, the main battery-section $e'$ will be placed in connection with the main line, the negative pole being connected by the wire 2, working-contact $t^5$, contact-spring $t^3$, and wire 1 with the earth at G, while the positive pole is connected by the wires 4 and 5 with the lever $t$, resting-contact $t^6$, and contact spring $t^2$ with the wire 7, and thus with the main line. In this instance a current due to an electro-motive force twice as great as that when the key K is depressed will be sent to line. When both keys K and K' are depressed, both battery-sections are placed in circuit, the negative pole of section $e'$ being to earth through wire 2, working-contact $t^5$, contact-spring $t^3$, and wire 1, while the positive pole of section $e^2$ is to line through wire 3, working-contact $t^4$, contact-spring $t^2$, and wire 7. In this position a current will be sent to line three times as great as when the key K alone is depressed.

The construction and arrangement of the receiving apparatus will now be considered.

R and R' represent two receiving-relays having differential electro-magnets, each electro-magnet being provided with three coils or helices of insulating-wire. The terminals of the helices $r$ $r'$ $r^2$ of the electro-magnet R are all connected with the wire 7, leading from the transmitting device. Two of these coils, $r$ and $r'$, are wound upon the core $m$ of the electro-magnet R in a given direction, and are respectively connected by the wires 9 and 10 with the terminals of the corresponding helices, $r^3$ and $r^4$, of the second relay electro-magnet, R'. These helices are wound in the same direction, one of them being connected with the wire 11, leading to the earth at G', and including in its circuit an artificial resistance, B, and electro-magnetic inductor-coils I, while the other, $r^4$, is connected with the main line L. The remaining coil, $r^2$, of the electro-magnet R is wound in the opposite direction from the helices $r$ and $r'$, and is connected by a wire, 12, with the helix $r^5$ of the electro-magnet R', which helix is wound in opposition to the helices $r^3$ and $r^4$. It will now be readily understood that a current passing from the transmitting apparatus at the home station will divide at the point S, one portion passing over the branch wire or conductor, which includes the helices $r^2$ and $r^5$, to the earth at G', the other portion dividing between the conductors comprising the helices $r$ $r'$ and $r^3$ $r^4$, the portion traversing the helix $r^3$ passing over the main line L, while that traversing the helix $r^4$ passes to the earth by way of wire 11. If, therefore, the electrical resistance of the branch comprising the coils $r^2$ $r^5$ be made equal to the joint resistance of the conductors comprising the coils $r$ $r'$ and $r^3$ $r^4$ and the main line L, the effect of an outgoing current will be exactly neutralized in each of the two electro-magnets.

The electro-magnet R is provided with an armature, $a$, supported upon the armature-lever A, which is pivoted at $c$, and provided with an adjustable retractile spring, $a^2$. The free end of the armature-lever A normally rests against a back contact-stop, $s$. A contact-lever, D, is pivoted at $d$ in such a position that when the armature-lever A is attracted into its forward position toward its electro-magnet R it will impinge upon the end of the contact-lever. A retractile spring, $a^4$, normally pulls the contact-lever D in the direction of the armature-lever A, against a contact-stop, $d^2$, which is so adjusted that when both the armature-lever and the contact-lever are in their extreme backward positions they will remain out of contact with each other;

but when the armature-lever A is carried forward with sufficient force it will push the contact-lever D from its stop $d^2$ and against a limiting-stop, $d^4$. The electro-magnet R' is likewise provided with an armature, $a'$, carried upon an armature-lever, A', and provided with a contact-stop, $s'$. A retractile spring, $a^3$, serves to normally withdraw the armature from its electro-magnet. A contact-lever, D', similar to the lever D, pivoted at $d'$, is also provided, against which the armature-lever A' strikes when drawn toward the poles of its electro-magnet R'. Similar contact-stops, $d^3$ and $d^5$, and a retractile spring, $a^5$, are also provided. The relative tensions of the retractile springs $a^2$, $a^3$, $a^4$, and $a^5$ are so adjusted with reference to the attractive forces of the electro-magnets that a current due to an electro-motive force of, say, fifty volts will be sufficient to overcome the resistance of the spring $a^2$ and carry the armature-lever A from its back contact stop, $s$, placing it in contact with the contact-lever D. This current, however, will not be sufficient to overcome the combined tensions of the springs $a^4$ and $a^2$, nor to overcome the tension exerted by the spring $a^3$ upon the armature-lever A'. A current from an electro-motive force of one hundred volts, however, will be sufficient to overcome the tension of both the springs $a^4$ and $a^2$, causing the contact-lever D to rest against the contact $d^4$, and at the same time to overcome the tension of the spring $a^3$; but it will not be sufficient to overcome the combined tensions of the springs $a^3$ and $a^5$. A current, however, due to an electro-motive force of one hundred and fifty volts will be sufficient to overcome the tensions of all the springs $a^4$ and $a^2$ and $a^3$ and $a^5$, placing the armature-levers A and A' in contact with their respective contact-levers D and D', and the latter in contact with the stops $d^4$ and $d^5$, respectively. In this manner I am enabled to provide four contacts or sets of contacts, corresponding, respectively, with no current, a current from an electro-motive force of fifty volts, one hundred volts, and one hundred and fifty volts, respectively. It is evident that such currents will actuate the electro-magnets, as before described, only when coming from the main line L.

Two sounders, registers, or other receiving-instruments, N and N', are connected with the armatures and contact-levers of the relays R and R', the former of which is designed to respond to currents from an electro-motive force of fifty volts and the latter from a like force of one hundred volts, while both respond to a force of one hundred and fifty volts. The electro-magnet of the receiving-instrument N is provided with four helices, $r^6$, $r^7$, $r^8$, and $r^9$, the alternate helices being wound in the opposite directions. It is evident that equal currents traversing these coils will oppose and neutralize each other. If, however, any one of the circuits including these helices be interrupted, the effect of the current passing through the remaining helix of that pair will not be counteracted, and will be manifested by the magnetization of the core $m^2$, and the consequent attraction exerted upon the armature $m^3$, carried upon an armature-lever, $A^3$. A retractile spring normally holds the armature-lever $A^3$ away from its electro-magnet, but allows it to respond to the magnetization produced in the core $m^2$ by an unopposed current traversing one of the coils, $r^6$, $r^7$, $r^8$, or $r^9$, in the manner of an ordinary sounder.

One pole of a local battery, $p$, is connected by a wire, 13, with both armature-levers A and A', while its opposite pole is connected by a wire, 14, with the opposing coils $r^6$ and $r^7$ of the receiving-instrument N, the remaining terminals of which coils are respectively connected by the wires 15 and 16 with the contact-stops $s$ and $s'$. The circuit, therefore, of the battery $p$ normally remains closed through both these helices, the stops $s$ and $s'$, and the armature-levers A and A'. The effects of the currents in the coils will, however, be equal and opposite, and the armature $m^3$ will not be attracted. A second local battery, $p'$, is likewise connected by a wire, 17, with the terminals of the remaining pair of helices $r^8$ and $r^9$, the opposite terminals of which are respectively connected with the contact-stop $d^2$ by a wire, 18, and the contact-lever D by a wire, 19, which lever is also connected with the opposite pole of the battery $p'$. When, therefore, the contact-lever D is in its normal position, the circuit of the battery $p'$ will be closed through both helices $r^8$ and $r^9$, the effects of which are opposite, and will neutralize each other. The armature-lever $A^3$ of the receiving-instrument N will therefore remain unaffected.

The second receiving-instrument, N', consists of an electro-magnet, $m^4$, having but one coil, $r^{10}$, and provided with an armature and armature-lever, $A^4$, of ordinary construction. The coil $r^{10}$ is included in the circuit of a local battery, $p^3$, the opposite poles of which are respectively connected with the contact-lever D' and its contact-stop $d^5$. The circuit of the battery $p^3$ is normally open, but is closed whenever the contact-lever D' is placed in contact with the contact-stop $d^5$.

The operation of the receiving apparatus is as follows: When currents of any strength are transmitted from the battery-sections $e'$ and $e^2$ upon the line L, no effect will be manifested in the electro-magnets R and R' by virtue of their differential construction. When, however, a current occasioned by an electro-motive force of, say, fifty volts is received from the main line L through the coils $r^3$ and $r$, it will produce in the core $m$ sufficient magnetization to cause the armature-lever A to break its contact with the back-stop $s$ and interrupt the current traversing the coil $r^7$. The receiving-instrument N will thereupon respond to the attraction produced by the current traversing the coil $r^6$. When a current from an electro-motive force of one hundred volts is received from the main line, it will cause both armature-levers A and A' to be attracted. The former will rest against the contact-lever D, interrupting the circuit through the coil $r^5$, while the latter will not only be drawn from its back contact-stop, $s'$, interrupting the circuit through the coil $r^6$, but will also carry the contact-lever D' against the contact-stop $d^5$, thus closing the circuit of the battery $p^3$ through the electro-magnet of the receiving-instrument N'. The receiving-instrument N therefore remains inactive, while the remaining receiving-instrument N' responds to currents from an electro-motive force of one hundred volts. When the electro-motive force of the battery traversing the relay electro-magnets is one hundred and fifty volts, both armature-levers and contact-levers will be carried into their forward position, causing the receiving-instrument N to respond to the influence of the current from the battery $p'$, which then traverses the coil $r^9$ only, the circuits of the other three being broken, and the instrument N' to respond to the current from the battery $p^3$, the circuit of which is complete, as in the instance where a current due to an electro-motive force of one hundred volts traverses the electro-magnets R and R'.

It is well known that the amount of the static accumulation upon a given telegraph-line is not uniform, but, on the contrary, varies at different times, in consequence of changes in the insulation of the conductor, and therefore the force and duration of the discharge-current will be greater at some times than at others. The actual resistance of the line itself as presented to the battery at the home station also varies from time to time, but not always in proportion to the variation in the static charge; hence it becomes essential, in order to adapt the apparatus to different atmospheric and other conditions, there should be means provided whereby the resistance of the branch line 11 and the force and duration of the discharge from the electro-magnetic inductor may be regulated independently of each other. In order to accomplish this result, I prefer to construct the inductor substantially in the manner shown in the diagram, Fig. 2, in which the total resistance is made up of a series of graduated artificial resistances, of which a greater or less number may be placed in circuit at pleasure. In the drawings I have shown three such, for the sake of illustration; but I remark that any required number, either greater or less, may be used, as circumstances require.

I prefer, also, to construct the electro-magnetic inductor I in several sections, three of which are shown in the diagram, Fig. 2. The sections are composed of soft-iron cores of different lengths, as shown at $i'$, $i^2$, and $i^3$. By means of a peg-commutator, Q, of well-known construction, any one or more of these inductor-sections may be placed in circuit at pleasure, the length or duration of the charge or discharge depending upon the length of the particular iron core in circuit, $i'$ being the shortest, and consequently charging and discharging with the greatest rapidity, while $i^3$ is the longest and requires the longest time for its charge and discharge. In like manner the force or intensity of the discharge may be independently regulated by including a greater or less number of the artificial resistances $c'$, $c^2$, and $c^3$ in the circuit.

It is obvious that the capacity of the several inductor-sections and resistances may be graduated or graded with reference to each other, so that any required combination may be effected, and that the number of sections may be increased to suit circumstances.

I claim as my invention—

1. The combination, substantially as hereinbefore set forth, of a main line, an artificial line, a branch line extending from the junction of the main and artificial lines to the earth, a main battery, a key or transmitter which connects said battery simultaneously to said main, artificial, and branch lines, a receiving-instrument upon which the outgoing currents through the main and branch lines produce an aggregate effect which is equal and opposite to that of the outgoing current through the artificial line, and an electro-magnetic inductor included in the said branch line.

2. The combination, substantially as hereinbefore set forth, of a main line, an artificial line, a branch line extending from the junction of the main and artificial lines to the earth, a main battery, a key or transmitter which connects said battery simultaneously to said main, artificial, and branch lines, a receiving-instrument upon which the outgoing currents through the main and branch lines produce an aggregate effect which is equal and opposite to that of the outgoing current through the artificial line, an electro-magnetic inductor included in the said branch line, and means for varying the normal electrical resistance of said branch line.

3. The combination, substantially as hereinbefore set forth, of a main line, an artificial line, a branch line extending from the junction of the main and artificial lines to the earth, a main battery, a key or transmitter which connects said battery simultaneously to said main, artificial, and branch lines, a receiving-instrument upon which the outgoing currents through the main and branch lines produce an aggregate effect which is equal and opposite to that of the outgoing current through the artificial line, an electro-magnetic inductor included in said branch line, and means for varying the intensity or force of the electric discharge from said inductor.

4. The combination, substantially as hereinbefore set forth, of a main line, an artificial line, a branch line extending from the junction of the main and artificial lines to the earth, a main battery, a key or transmitter which connects said battery simultaneously to said main, artificial, and branch lines, a receiving-instrument upon which the outgoing currents through the main and branch lines produce an aggregate effect which is equal and opposite to that of the outgoing current through the artificial line, an electro-magnetic inductor included in the said branch line, and means for varying the length or duration of the electric discharge from said inductor.

5. The combination, substantially as hereinbefore set forth, of a main line, an artificial line, a branch line extending from the junction of the main and artificial lines to the earth, a main battery, a key or transmitter for connecting said battery simultaneously to said main, artificial, and branch lines, and a receiving-magnet wound with two mutual assisting coils and one opposing coil, the former being respectively included in the main and branch lines, and the latter in the artificial line.

In testimony whereof I have hereunto subscribed my name this 8th day of August, A. D. 1883.

FRANCIS W. JONES.

Witnesses:
DANIEL W. EDGECOMB,
CHARLES A. TERRY.